US006852151B2

(12) United States Patent
Bloomer

(10) Patent No.: US 6,852,151 B2
(45) Date of Patent: Feb. 8, 2005

(54) AIR CLEANER AND RESONATOR ASSEMBLY

(75) Inventor: Stephen Francis Bloomer, London (CA)

(73) Assignee: Siemens VDO Automotive Inc., Chatham (CA)

( * ) Notice: Subject to any disclaimer, the term of this patent is extended or adjusted under 35 U.S.C. 154(b) by 90 days.

(21) Appl. No.: 10/444,015

(22) Filed: May 22, 2003

(65) Prior Publication Data

US 2003/0221562 A1 Dec. 4, 2003

Related U.S. Application Data

(60) Provisional application No. 60/385,377, filed on Jun. 3, 2002.

(51) Int. Cl.[7] .................................... B01D 46/00

(52) U.S. Cl. .................. 96/386; 55/385.3; 123/184.57; 123/198 E; 181/229

(58) Field of Search .................. 96/384, 386; 55/385.3; 123/184.57, 198; 181/229

(56) References Cited

U.S. PATENT DOCUMENTS 6,783,579 B2 * 8/2004 Pettipiece .................... 96/384

FOREIGN PATENT DOCUMENTS

JP 02019644 A * 1/1990 ............ 123/198 E

* cited by examiner

*Primary Examiner*—Robert A. Hopkins

(57) ABSTRACT

An air cleaner and resonator assembly is formed from a lower shell portion and an upper shell portion that are joined together to define an interior cavity having an inlet through which air is drawn. An exit tube, formed within the lower shell portion, directs air from the inlet to the engine. A middle shell portion is positioned within the inter cavity and is joined to both the upper and lower shell portions. A lower portion of a resonator is molded into the lower shell portion and an upper portion of the resonator assembly is molded into the middle shell portion. The upper portion is aligned with the lower portion and the middle and lower shell portions are welded together to form a sealed resonator chamber that attenuates engine noise. The upper and lower shell portions are then welded together to form the air cleaner and resonator assembly. Air filters are installed within the interior cavity and are selectively accessible through movable covers installed in the upper shell portion. The air filters are mounted on tube mounts molded into the middle shell portion and rest on cradle mounts formed on the lower shell portion.

21 Claims, 3 Drawing Sheets

AIR CLEANER AND RESONATOR ASSEMBLY

CROSS-REFERENCE TO RELATED APPLICATIONS

The application claims priority to U.S. Provisional Application No. 60/385,377, which was filed on Jun. 3, 2002.

BACKGROUND OF THE INVENTION

This invention is directed to an engine air cleaner that includes an integrally formed resonator.

Air induction systems are used to conduct air to internal combustion engines. The use of air induction systems has resulted in the need for additional vehicle system components to compensate for certain undesirable side effects generated by the connection of air induction components to the vehicle engine. For example, engine noise is propagated back through the air induction components, which is undesirable. To address this problem, noise attenuation components, such as resonators, have been utilized to reduce these noises.

Another undesirable side effect introduced by air induction components, is that the air that is drawn into the air induction system includes dust, dirt, and other particulate contaminants. These contaminants can clog the engine resulting in poor performance. Air cleaners with filters are used to remove these contaminants from the airflow prior to the air being drawn into the engine.

The use of these additional components such as the resonator and air cleaner increases material and overall system costs. Further, the assembly of the additional components into the air induction system is time consuming and labor intensive. Thus, it is the object of the present invention to provide a simplified air cleaner and resonator assembly that reduces the overall number of required components, and which can be easily assembled, as well as overcoming the other above-mentioned deficiencies with the prior art.

SUMMARY OF THE INVENTION

An air cleaner and resonator assembly is formed from a plurality of air cleaner shells or housing portions that are joined together. A lower portion of a resonator is formed within one of the housing portions and an upper portion of the resonator is formed within another of the housing portions. The upper and lower portions of the resonator are then joined together to form a sealed resonator chamber that is positioned within the air cleaner. The air cleaner and resonator assembly thus forms a unitary structure that simultaneously attenuates engine noise and filters contaminants from the air.

In one disclosed embodiment, the air cleaner and resonator assembly is formed from a lower shell and an upper shell that are joined together to define an interior cavity having an inlet through which air is drawn. An outlet portion, formed within the lower shell, directs air from the inlet to the engine. A middle shell is positioned within the inner cavity and is joined to both the upper and lower shells. A lower portion of a resonator is molded into the lower shell and an upper portion of the resonator assembly is molded into the middle shell. The upper portion is aligned with the lower portion and the middle and lower shells are welded together to form a sealed resonator chamber that attenuates engine noise. The upper and lower shell portions are then welded together to form the air cleaner and resonator assembly. A portion of the upper shell is also preferably welded to the middle shell to increase strength and stiffness.

Air filters are installed within the interior cavity and are selectively accessible through movable covers installed in the upper shell portion. The air filters are mounted on tube mounts molded into the middle shell portion and rest on cradle mounts formed on the lower shell portion.

The outlet portion preferably comprises an exit tube that is molded into the lower shell. A lower neck portion is also molded into the lower shell with a corresponding upper neck portion being molded into the middle shell. The upper and lower neck portions are aligned and joined within one another to form a neck that interconnects the exit tube to the resonator. Air flows into the inlet, through the filters and into the exit tube via the tube mounts. Clean air then flows in a first direction within the exit tube toward the engine. Noise from the engine proceeds in a second direction, opposite from the first direction, and is attenuated by the resonator.

The method for forming the air cleaner and resonator assembly includes the following steps. The lower shell is formed with a lower resonator portion and the middle shell is formed with an upper resonator portion. The middle shell is welded to the lower shell to form a sealed resonator chamber that attenuates engine noise. This welding operation forms a first weld joint between the middle and lower shells. Additional steps include welding the upper shell to the lower shell to form a second weld joint and welding the upper shell to the middle shell to form a third weld joint.

The subject method and apparatus provides an air induction system that includes a unitary air cleaner and resonator assembly. These and other features of the present invention can be best understood from the following specifications and drawings, the following of which is a brief description.

DETAILED DESCRIPTION OF A PREFERRED EMBODIMENT

Figures 1, 2:
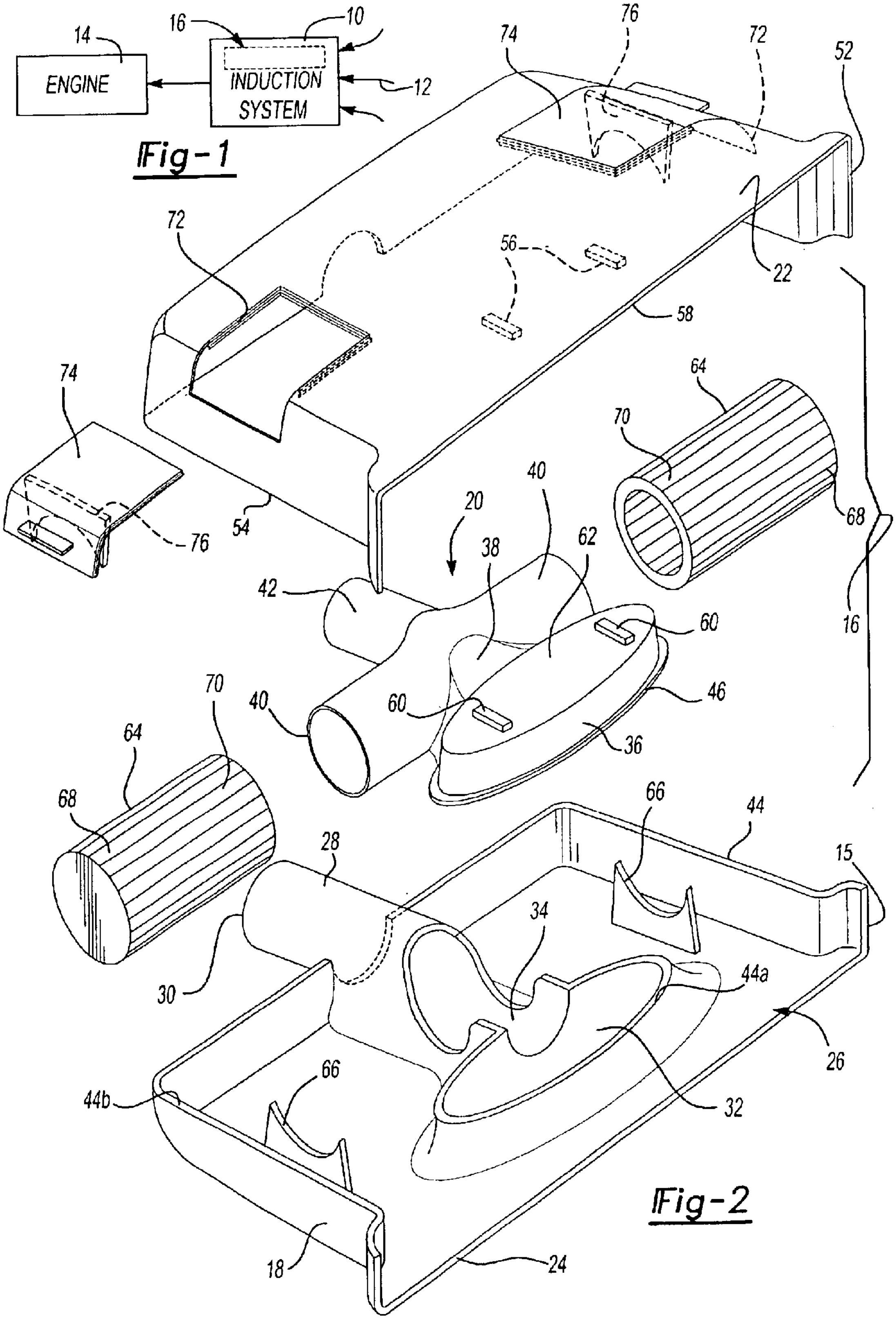
FIG. 1 is a schematic diagram of an engine and induction system incorporating the subject invention.
FIG. 2 is an exploded view of the subject resonator and air filter assembly.

As shown in FIG. 1, an induction system 10 draws air 12 into a vehicle engine 14. In order to ensure that the engine 14 operates quietly and efficiently, the induction system 10 includes a resonator and air filter assembly, shown generally at 16.

The resonator and air filter assembly 16 is shown in greater detail in FIG. 2. The resonator and air filter assembly 16 includes a lower shell 18, a middle shell 20, and an upper shell 22. The lower shell 18 includes a lower mouth portion 24 that forms an air inlet 26, and an exit tube 28 that forms an air outlet 30 to the engine 14. The lower shell 18 also includes a lower resonator portion 32 and a lower neck portion 34 that interconnects the lower resonator portion 32 to the exit tube 28.

The middle shell 20 includes an upper resonator portion 36, an upper neck portion 38, and a pair of air filter mounting tubes 40. The middle shell 20 also includes a small upper portion 42 that forms a portion of the exit tube 28. The exit tube 28 and upper neck portion 38 extend in a generally longitudinal direction while the air filter mounting tubes 40 extend outwardly from the upper neck portion 38 in opposing directions from each other and in a generally lateral direction that is transverse to the longitudinal direction.

A first attachment interface 44 is formed about an upper edge of the lower shell 18. The first attachment interface 44 includes a first interface portion 44*a* that extends along upper edges of the lower resonator portion 32 and the lower neck portion 34, and a second interface portion 44*b* that is formed about the upper perimeter of the lower shell 18. A second attachment interface 46 is formed about the lower edge of the middle shell 20. The second attachment interface 46 extends around the bottom edge face of the upper resonator portion 36 and the bottom face of the upper neck portion 38. The first interface portion 44*a* and the second attachment interface 46 are aligned with and positioned in abutting engagement with each other. Once the attachment interfaces 44*a*, 46 are aligned properly, the middle 20 and lower 18 shells are attached together.

Figure 3:
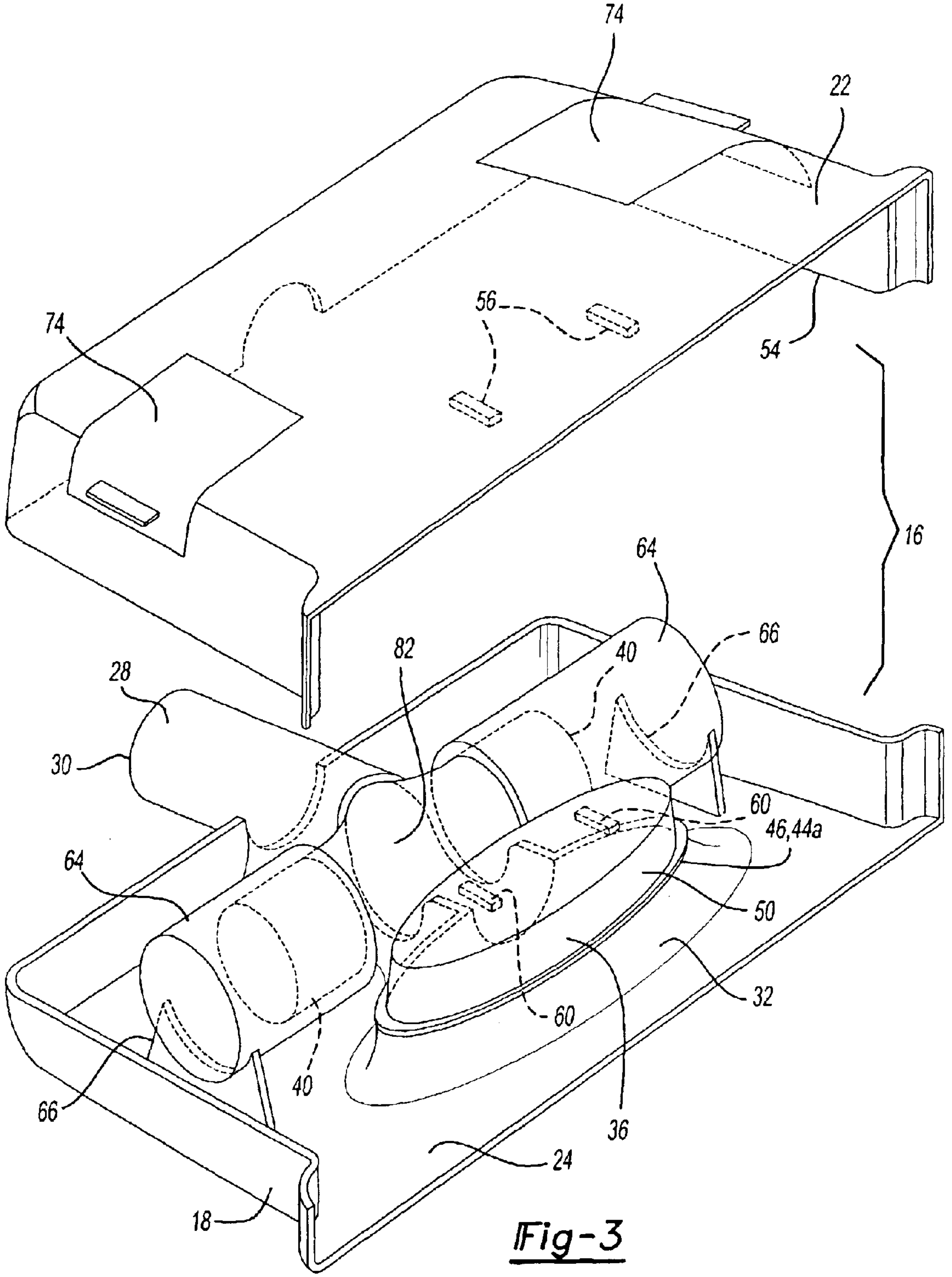
FIG. 3 is a partial exploded view of the resonator and air filter assembly of FIG. 1 showing middle and lower shell portions attached together.

Preferably, the first 44 and second 46 attachment interfaces are welded together by vibration welding, hot plate welding, or other similar welding process known in the art. Thus, a weld joint is formed between the middle 20 and lower 18 shells to provide a secure and permanent attachment. Once this attachment is formed, the lower 32 and upper 36 resonator portions cooperate to form a sealed resonance chamber 50, see FIG. 3. The resonance chamber 50 attenuates engine noise that is propagated back through the induction system 10.

The upper shell 22 includes an upper mouth portion 52 that forms part of the air inlet 26. The upper 52 and lower 24 mouth portions cooperate to form a bell shaped mouth. The bell-shaped feature formed about the perimeter of the air inlet minimizes inlet airflow pressure losses. The upper shell 22 defines a third attachment interface 54 that extends about the lower edge. The third attachment interface 54 is positioned in an overlapping relationship to the second attachment interface portion 44*b* of the lower shell 18. Once the upper 22 and lower 18 shells are properly aligned with one another, the shells 22, 18 are attached together to enclose the resonator chamber 50 within the induction system 10. Preferably, the second interface portion 44*b* and third attachment interface 54 are welded together by vibration welding, hot-plate welding, or other similar welding process known in the art. Thus, a weld joint is formed between the upper 22 and lower 18 shells to provide a secure and permanent attachment.

The upper shell 22 includes a first plurality of joining areas 56 formed on a lower surface 58 of the upper shell 22 that correspond to a second plurality of joining areas 60 formed on an upper surface 62 of the middle shell 20. The first 56 and second 60 pluralities of joining areas are aligned with each other and are welded together, as discussed above.

The induction system 10 also includes air filters 64 that filter contaminant particulates that are drawn in through the air inlet 26. Cradles 66 are formed on the lower shell 18 to support one end 68 of each filter 64. Opposite ends 70 of the filters 64 are mated with the air filter mounting tubes 40 formed on the middle shell 20.

Openings 72 are formed in the upper shell 22 to facilitate access to the filters 64 for service and/or replacement. Doors 74 are snap-fit, or similarly installed, to cover the openings 72 during vehicle operation. Upper cradles 76 can be formed on the bottom surface of the doors 74 to provide additional support for the filters 64.

Figure 4:
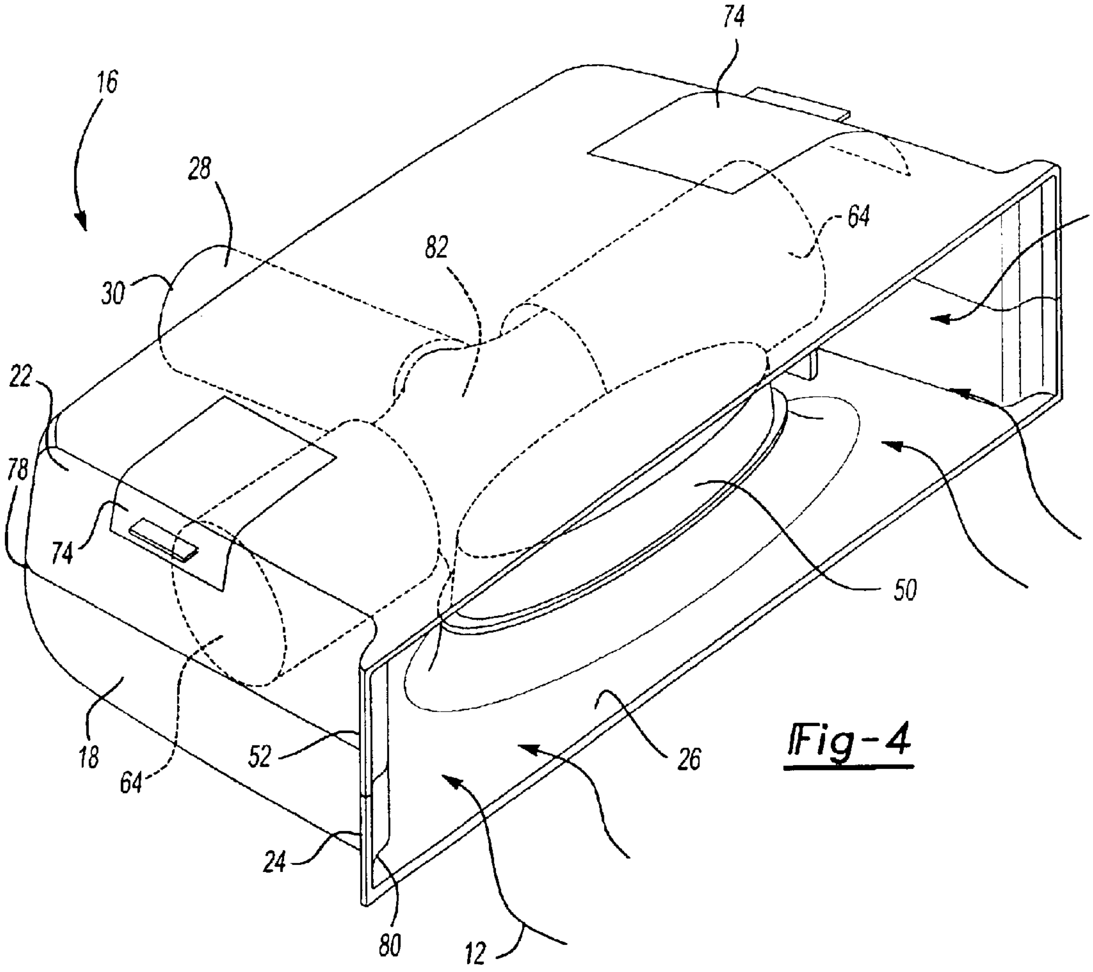
FIG. 4 is a perspective view of the resonator and air filter assembly of FIG. 1 showing the upper, middle, and lower shell portions attached together.

Preferably, the lower shell 18, middle shell 20, and upper shell 22 are formed from a plastic material in an injection molding process. The upper 22 and lower 18 shells are joined together during the welding process along the interfaces 44*b*, 54 to create an outer housing 78, see FIG. 4, of an air cleaner that has a generally rectangular air inlet 26 with a curved bell mouth feature 80.

Further, the exit tube 28, lower neck portion 34, and lower resonator portion 32 are preferably integrally molded within the lower shell 18. The upper resonator portion 36, upper neck portion 38, and filter mounting tubes 40 are all preferably molded within the middle shell 20. As discussed above, the middle shell 20 is welded to the lower shell 18 along attachment interface 46 onto the mating attachment interface 44*a* on the lower shell 18. This creates the resonance chamber 50, a neck 82, and filter mounting tube 40.

Then the upper 22 and lower 18 shells are welded together as described above. At this time, the first 56 and second 60 plurality of joining areas are welded together to join the upper shell 22 to the middle shell 20. Preferably, this attachment is formed at the resonator portions to create more strength and stiffness in the structure.

Finally, the air filters 64 are mounted to the attachment mounting tubes 40 on each side of the neck 82. Access to install and service the filters 64 is through the doors 74 that are positioned over the filters 64. Positioning and further retention of the filters 64 is achieved by the lower cradles 66 and the upper cradles 76. Preferably, the cradles 66, 76 are crescent-shaped ribs. The doors 74 are snapped into place and locate and retain each filter 64 vertically.

The air is drawn through the inlet 26 to either side of the resonance chamber 50 and enters the open space formed between the upper 22 and lower 18 shells. The air then flows into each respective air filter 64 and into the neck 62 via the mounting tubes 40. The air flows out of the exit tube 28 to the engine 14. Noise from the engine proceeds in an opposite direction from the airflow and is partially attenuated by the resonator 50.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. An air cleaner assembly comprising:

a lower shell having an inlet through which air is drawn and an outlet for directing the air to a vehicle engine, said lower shell defining a first attachment interface;

an upper shell defining a second attachment interface wherein said upper and lower shells are positioned in an overlapping relationship with said first and second attachment interfaces cooperating with each other to permanently secure said upper and lower shells together;

a resonator including a lower portion formed within said lower shell and an upper portion supported by said upper shell wherein said upper and lower portions are secured together to form a sealed resonator chamber that attenuates engine noise; and at least one air filter mounted between said upper and lower shells to remove contaminants from the air as the air flows from said inlet to said outlet.

2. The assembly set forth in claim 1 wherein said first attachment interface comprises a first weld joint interface formed substantially along an upper edge of said lower shell and wherein said second attachment interface comprises a second weld joint interface formed substantially along a lower edge of said upper shell with said second weld joint interface abutting against said first weld joint interface to form a first weld joint.

3. The assembly set forth in claim 2 including a middle shell positioned between said upper and lower shells wherein said upper portion of said resonator is formed within said middle shell.

4. The assembly set forth in claim 3 wherein said lower shell includes a third attachment interface comprising a third weld joint interface formed substantially about an upper edge of said lower portion of said resonator and wherein said middle shell includes a fourth attachment interface comprising a fourth weld joint interface formed substantially about a lower edge of said upper portion of said resonator with said fourth weld joint interface abutting against said third weld joint interface to form a second weld joint.

5. The assembly set forth in claim 4 wherein said middle shell and said upper shell are welded together to form a third weld joint.

6. The assembly set forth in claim 3 wherein said lower shell and said lower portion of said resonator are integrally formed as a single piece.

7. An air cleaner assembly comprising:

a lower shell having a lower air inlet portion and an air outlet for directing air to a vehicle engine, said lower shell defining a first attachment interface formed substantially about an upper edge of said lower shell;

an upper shell having an upper air inlet portion aligned with said lower air inlet portion to form an air inlet, said upper shell defining a second attachment interface formed substantially about a lower edge of said upper shell that cooperates with said first attachment interface to secure said upper shell to said lower shell;

at least one air filter mounted between said upper and lower shells to remove contaminants from the air as the air flows from said inlet to said outlet;

a middle shell positioned between said upper and lower shells and defining a third attachment interface formed substantially about a lower edge of said middle shell; and a resonator having a lower resonator portion formed within said lower shell and an upper resonator portion formed within said middle shell, said resonator defining a fourth attachment interface formed substantially about an upper edge of said lower resonator portion wherein said upper and lower resonator portions are aligned with each other with said third and fourth attachment interfaces cooperating to form a sealed resonator chamber that attenuates engine noise.

8. The assembly set forth in claim 7 wherein said third attachment interface abuts against said fourth attachment interface to form a first weld joint and said second attachment interface abuts against said first attachment interface to form a second weld joint.

9. The assembly set forth in claim 8 wherein said middle shell includes a fifth attachment interface formed on an upper surface of said middle shell and wherein said upper shell includes a sixth attachment interface formed on a lower surface of said upper shell, said fifth and sixth attachment interfaces abutting against each other to form a third weld joint.

10. The assembly set forth in claim 7 wherein said lower resonator portion is integrally formed with said lower shell as one piece and said upper resonator portion is integrally formed with said middle shell as one piece.

11. The assembly set forth in claim 7 wherein said outlet comprises an exit tube integrally formed with said lower shell as one piece.

12. The assembly set forth in claim 11 wherein said resonator includes a neck that interconnects said resonator to said exit tube and wherein said lower shell includes a lower neck portion that includes a portion of said fourth attachment interface and said middle shell includes an upper neck portion that includes a portion of said third attachment interface, said upper neck portion being aligned with said lower neck portion along said respective portions of said third and fourth attachment interfaces to form said neck.

13. The assembly set forth in claim 12 wherein said middle shell includes at least one filter connection tube for supporting one end of said air filter to define an airflow path from said inlet, through said air filter, into said filter connection tube, and out of said exit tube with said engine noise being propagated in an opposing direction to air flowing out of said exit tube.

14. The assembly set forth in claim 7 including at least one cradle support formed within said lower shell to support said air filter.

15. The assembly set forth in claim 7 wherein at least one of said upper or lower shells includes a filter cover selectively movable between open and closed positions to provide access to said filter.

16. A method for forming an air cleaner and resonator assembly comprising the steps of:

(a) providing a lower shell, an upper shell cooperating with the lower shell to define an interior cavity of an air cleaner, and a middle shell positioned within the interior cavity;

(b) forming the lower shell with a lower resonator portion;

(c) forming middle shell with an upper resonator portion; and (d) welding the middle shell to the lower shell to form a sealed resonator chamber that attenuates engine noise.

17. The method set forth in claim 16 including the step of (e) welding the upper shell to the lower shell subsequent to step (d).

18. The method set forth in claim 17 including the step of simultaneously welding a portion of the middle shell to the upper shell during step (e).

19. The method set forth in claim 17 including the step of (f) installing at least one air filter between the upper and lower shells after step (e).

20. The method set forth in claim 19 including the steps of forming at least one filter opening in at least one of the upper or lower shells, installing a filter cover to cover the filter opening, and selectively moving the filter cover between open and closed positions to access the air filter.

21. The method set forth in claim 16 including the steps of integrally molding the lower shell and lower resonator portion as one piece and integrally molding the middle shell and upper resonator portion as one piece.

* * * * *